United States Patent
Furuya

(10) Patent No.: US 11,438,557 B2
(45) Date of Patent: *Sep. 6, 2022

(54) PROJECTOR SYSTEM AND CAMERA

(71) Applicant: JVCKENWOOD CORPORATION, Yokohama (JP)

(72) Inventor: Masato Furuya, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 225 days.

This patent is subject to a terminal disclaimer.

(21) Appl. No.: 16/901,285

(22) Filed: Jun. 15, 2020

(65) Prior Publication Data

US 2020/0314393 A1 Oct. 1, 2020

Related U.S. Application Data

(63) Continuation of application No. PCT/JP2018/040133, filed on Oct. 29, 2018.

(30) Foreign Application Priority Data

Dec. 27, 2017 (JP) ................................. 2017-250532

(51) Int. Cl.
*G09G 5/10* (2006.01)
*H04N 9/31* (2006.01)
*G02F 1/133* (2006.01)
*G03B 21/00* (2006.01)
*H04N 5/74* (2006.01)

(Continued)

(52) U.S. Cl.
CPC .......... *H04N 9/3111* (2013.01); *G02F 1/133* (2013.01); *G03B 21/005* (2013.01); *G09G 3/002* (2013.01); *G09G 3/2022* (2013.01); *H04N 5/74* (2013.01)

(58) Field of Classification Search
CPC .... G09G 3/002; G09G 3/2002; G09G 3/3648; G09G 2320/0247; G09G 2320/0266; G09G 2320/0693; G02F 1/133; G03B 21/005; H04N 5/74; H04N 9/3111; H04N 9/3147; H04N 17/002
See application file for complete search history.

(56) References Cited

U.S. PATENT DOCUMENTS 7,742,011 B2 * 6/2010 Damera-Venkata ... G09G 3/007
345/1.3
9,064,476 B2 * 6/2015 Sun ........................ G06T 3/4053
(Continued)

FOREIGN PATENT DOCUMENTS

JP    2004-247979 A    9/2004

*Primary Examiner* — Joe H Cheng
(74) *Attorney, Agent, or Firm* — Nath, Goldberg & Meyer; Jerald L. Meyer; Morgan D. Rosenberg

(57) ABSTRACT

A projector system includes a plurality of projectors. The plurality of projectors generates an image based on input video data, superimpose the image, and display a display image. The projector includes a video data processor and a liquid crystal display device. The liquid crystal display device switches the images for each frame and displays the images in a frame-sequential manner. The video data processor includes sub-frame data conversion tables and sub-frame data generators. The sub-frame data generators convert the video data into pieces of sub-frame data based on the sub-frame data conversion tables.

4 Claims, 12 Drawing Sheets

(51) Int. Cl.
  *G09G 3/00*    (2006.01)
  *G09G 3/20*    (2006.01)

(56) References Cited

U.S. PATENT DOCUMENTS

| | | | | |
|---|---|---|---|---|
| 2006/0221304 | A1* | 10/2006 | Damera-Venkata | H04N 9/3105 |
| | | | | 353/30 |
| 2007/0097017 | A1* | 5/2007 | Widdowson | G09G 5/02 |
| | | | | 345/1.3 |
| 2007/0132965 | A1* | 6/2007 | Damera-Venkata | G03B 37/04 |
| | | | | 353/94 |
| 2008/0002160 | A1* | 1/2008 | Chang | G06T 5/006 |
| | | | | 353/94 |
| 2008/0024389 | A1* | 1/2008 | O'Brien-Strain | H04N 17/00 |
| | | | | 348/E9.027 |
| 2008/0024683 | A1* | 1/2008 | Damera-Venkata | H04N 9/3194 |
| | | | | 348/383 |
| 2008/0043209 | A1* | 2/2008 | Widdowson | G03B 21/26 |
| | | | | 353/94 |
| 2016/0261819 | A1* | 9/2016 | Mizushiro | H04N 21/47 |
| 2020/0344465 | A1* | 10/2020 | Kido | H04N 9/3179 |

* cited by examiner

| GRADATION VALUE | SUB-FRAME NUMBER | | | | | | | |
|---|---|---|---|---|---|---|---|---|
| | SF1 | SF2 | SF3 | SF4 | SF5 | SF6 | SF7 | SF8 |
| 0 | 0 | 0 | 0 | 0 | 0 | 0 | 0 | 0 |
| 1 | 1 | 0 | 0 | 0 | 0 | 0 | 0 | 0 |
| 2 | 1 | 1 | 0 | 0 | 0 | 0 | 0 | 0 |
| 3 | 1 | 1 | 1 | 0 | 0 | 0 | 0 | 0 |
| 4 | 1 | 1 | 1 | 1 | 0 | 0 | 0 | 0 |
| 5 | 1 | 1 | 1 | 1 | 1 | 0 | 0 | 0 |
| 6 | 1 | 1 | 1 | 1 | 1 | 1 | 0 | 0 |
| 7 | 1 | 1 | 1 | 1 | 1 | 1 | 1 | 0 |

| GRADATION VALUE | SUB-FRAME NUMBER | | | | | | | |
|---|---|---|---|---|---|---|---|---|
| | SF1 | SF2 | SF3 | SF4 | SF5 | SF6 | SF7 | SF8 |
| 0 | 0 | 0 | 0 | 0 | 0 | 0 | 0 | 0 |
| 1 | 0 | 0 | 1 | 0 | 0 | 0 | 0 | 0 |
| 2 | 0 | 0 | 1 | 1 | 0 | 0 | 0 | 0 |
| 3 | 0 | 0 | 1 | 1 | 1 | 0 | 0 | 0 |
| 4 | 0 | 0 | 1 | 1 | 1 | 1 | 0 | 0 |
| 5 | 0 | 0 | 1 | 1 | 1 | 1 | 1 | 0 |
| 6 | 0 | 0 | 1 | 1 | 1 | 1 | 1 | 1 |
| 7 | 1 | 0 | 1 | 1 | 1 | 1 | 1 | 1 |

| GRADATION VALUE | SUB-FRAME NUMBER | | | | | | | |
|---|---|---|---|---|---|---|---|---|
| | SF1 | SF2 | SF3 | SF4 | SF5 | SF6 | SF7 | SF8 |
| 0 | 0 | 0 | 0 | 0 | 0 | 0 | 0 | 0 |
| 1 | 0 | 0 | 0 | 0 | 1 | 0 | 0 | 0 |
| 2 | 0 | 0 | 0 | 0 | 1 | 1 | 0 | 0 |
| 3 | 0 | 0 | 0 | 0 | 1 | 1 | 1 | 0 |
| 4 | 0 | 0 | 0 | 0 | 1 | 1 | 1 | 1 |
| 5 | 1 | 0 | 0 | 0 | 1 | 1 | 1 | 1 |
| 6 | 1 | 1 | 0 | 0 | 1 | 1 | 1 | 1 |
| 7 | 1 | 1 | 1 | 0 | 1 | 1 | 1 | 1 |

| GRADATION VALUE | SUB-FRAME NUMBER | | | | | | | |
|---|---|---|---|---|---|---|---|---|
| | SF1 | SF2 | SF3 | SF4 | SF5 | SF6 | SF7 | SF8 |
| 0 | 0 | 0 | 0 | 0 | 0 | 0 | 0 | 0 |
| 1 | 0 | 0 | 0 | 0 | 0 | 0 | 1 | 0 |
| 2 | 0 | 0 | 0 | 0 | 0 | 0 | 1 | 1 |
| 3 | 1 | 0 | 0 | 0 | 0 | 0 | 1 | 1 |
| 4 | 1 | 1 | 0 | 0 | 0 | 0 | 1 | 1 |
| 5 | 1 | 1 | 1 | 0 | 0 | 0 | 1 | 1 |
| 6 | 1 | 1 | 1 | 1 | 0 | 0 | 1 | 1 |
| 7 | 1 | 1 | 1 | 1 | 1 | 0 | 1 | 1 |

FIG. 5

| PROJECTOR | ORDER OF SUB-FRAMES SF IN WHICH DATA VALUE BECOMES 1 WITHIN ONE FRAME PERIOD | | | | | | |
|---|---|---|---|---|---|---|---|
| | 1st | 2nd | 3rd | 4th | 5th | 6th | 7th |
| 11 | SF1 | SF2 | SF3 | SF4 | SF5 | SF6 | SF7 |
| 12 | SF3 | SF4 | SF5 | SF6 | SF7 | SF8 | SF1 |
| 13 | SF5 | SF6 | SF7 | SF8 | SF1 | SF2 | SF3 |
| 14 | SF7 | SF8 | SF1 | SF2 | SF3 | SF4 | SF5 |

FIG. 6

| GRADATION VALUE | PROJECTOR | SUB-FRAME NUMBER | | | | | | | |
|---|---|---|---|---|---|---|---|---|---|
| | | SF1 | SF2 | SF3 | SF4 | SF5 | SF6 | SF7 | SF8 |
| 0 | 11 | 0 | 0 | 0 | 0 | 0 | 0 | 0 | 0 |
| | 12 | 0 | 0 | 0 | 0 | 0 | 0 | 0 | 0 |
| | 13 | 0 | 0 | 0 | 0 | 0 | 0 | 0 | 0 |
| | 14 | 0 | 0 | 0 | 0 | 0 | 0 | 0 | 0 |
| 1 | 11 | 1 | 0 | 0 | 0 | 0 | 0 | 0 | 0 |
| | 12 | 0 | 0 | 1 | 0 | 0 | 0 | 0 | 0 |
| | 13 | 0 | 0 | 0 | 0 | 1 | 0 | 0 | 0 |
| | 14 | 0 | 0 | 0 | 0 | 0 | 0 | 1 | 0 |
| 2 | 11 | 1 | 1 | 0 | 0 | 0 | 0 | 0 | 0 |
| | 12 | 0 | 0 | 1 | 1 | 0 | 0 | 0 | 0 |
| | 13 | 0 | 0 | 0 | 0 | 1 | 1 | 0 | 0 |
| | 14 | 0 | 0 | 0 | 0 | 0 | 0 | 1 | 1 |
| 3 | 11 | 1 | 1 | 1 | 0 | 0 | 0 | 0 | 0 |
| | 12 | 0 | 0 | 1 | 1 | 1 | 0 | 0 | 0 |
| | 13 | 0 | 0 | 0 | 0 | 1 | 1 | 1 | 0 |
| | 14 | 1 | 0 | 0 | 0 | 0 | 0 | 1 | 1 |
| 4 | 11 | 1 | 1 | 1 | 1 | 0 | 0 | 0 | 0 |
| | 12 | 0 | 0 | 1 | 1 | 1 | 1 | 0 | 0 |
| | 13 | 0 | 0 | 0 | 0 | 1 | 1 | 1 | 1 |
| | 14 | 1 | 1 | 0 | 0 | 0 | 0 | 1 | 1 |
| 5 | 11 | 1 | 1 | 1 | 1 | 1 | 0 | 0 | 0 |
| | 12 | 0 | 0 | 1 | 1 | 1 | 1 | 1 | 0 |
| | 13 | 1 | 0 | 0 | 0 | 1 | 1 | 1 | 1 |
| | 14 | 1 | 1 | 1 | 0 | 0 | 0 | 1 | 1 |
| 6 | 11 | 1 | 1 | 1 | 1 | 1 | 1 | 0 | 0 |
| | 12 | 0 | 0 | 1 | 1 | 1 | 1 | 1 | 1 |
| | 13 | 1 | 1 | 0 | 0 | 1 | 1 | 1 | 1 |
| | 14 | 1 | 1 | 1 | 1 | 0 | 0 | 1 | 1 |
| 7 | 11 | 1 | 1 | 1 | 1 | 1 | 1 | 1 | 0 |
| | 12 | 1 | 0 | 1 | 1 | 1 | 1 | 1 | 1 |
| | 13 | 1 | 1 | 1 | 0 | 1 | 1 | 1 | 1 |
| | 14 | 1 | 1 | 1 | 1 | 1 | 0 | 1 | 1 |

| GRADATION VALUE | SUB-FRAME NUMBER | | | | | | | |
|---|---|---|---|---|---|---|---|---|
| | SF1 | SF2 | SF3 | SF4 | SF5 | SF6 | SF7 | SF8 |
| 0 | 0 | 0 | 0 | 0 | 0 | 0 | 0 | 0 |
| 1 | 1 | 0 | 0 | 0 | 0 | 0 | 0 | 0 |
| 2 | 1 | 0 | 0 | 1 | 0 | 0 | 0 | 0 |
| 3 | 1 | 0 | 0 | 1 | 0 | 0 | 1 | 0 |
| 4 | 1 | 1 | 0 | 1 | 0 | 0 | 1 | 0 |
| 5 | 1 | 1 | 0 | 1 | 1 | 0 | 1 | 0 |
| 6 | 1 | 1 | 0 | 1 | 1 | 0 | 1 | 1 |
| 7 | 1 | 1 | 1 | 1 | 1 | 0 | 1 | 1 |

| GRADATION VALUE | SUB-FRAME NUMBER | | | | | | | |
|---|---|---|---|---|---|---|---|---|
| | SF1 | SF2 | SF3 | SF4 | SF5 | SF6 | SF7 | SF8 |
| 0 | 0 | 0 | 0 | 0 | 0 | 0 | 0 | 0 |
| 1 | 0 | 0 | 1 | 0 | 0 | 0 | 0 | 0 |
| 2 | 0 | 0 | 1 | 0 | 0 | 1 | 0 | 0 |
| 3 | 1 | 0 | 1 | 0 | 0 | 1 | 0 | 0 |
| 4 | 1 | 0 | 1 | 1 | 0 | 1 | 0 | 0 |
| 5 | 1 | 0 | 1 | 1 | 0 | 1 | 1 | 0 |
| 6 | 1 | 1 | 1 | 1 | 0 | 1 | 1 | 0 |
| 7 | 1 | 1 | 1 | 1 | 1 | 1 | 1 | 0 |

| GRADATION VALUE | SUB-FRAME NUMBER | | | | | | | |
|---|---|---|---|---|---|---|---|---|
| | SF1 | SF2 | SF3 | SF4 | SF5 | SF6 | SF7 | SF8 |
| 0 | 0 | 0 | 0 | 0 | 0 | 0 | 0 | 0 |
| 1 | 0 | 0 | 0 | 0 | 1 | 0 | 0 | 0 |
| 2 | 0 | 0 | 0 | 0 | 1 | 0 | 0 | 1 |
| 3 | 0 | 0 | 1 | 0 | 1 | 0 | 0 | 1 |
| 4 | 0 | 0 | 1 | 0 | 1 | 1 | 0 | 1 |
| 5 | 1 | 0 | 1 | 0 | 1 | 1 | 0 | 1 |
| 6 | 1 | 0 | 1 | 1 | 1 | 1 | 0 | 1 |
| 7 | 1 | 0 | 1 | 1 | 1 | 1 | 1 | 1 |

| GRADATION VALUE | SUB-FRAME NUMBER | | | | | | | |
|---|---|---|---|---|---|---|---|---|
| | SF1 | SF2 | SF3 | SF4 | SF5 | SF6 | SF7 | SF8 |
| 0 | 0 | 0 | 0 | 0 | 0 | 0 | 0 | 0 |
| 1 | 0 | 0 | 0 | 0 | 0 | 0 | 1 | 0 |
| 2 | 0 | 1 | 0 | 0 | 0 | 0 | 1 | 0 |
| 3 | 0 | 1 | 0 | 0 | 1 | 0 | 1 | 0 |
| 4 | 0 | 1 | 0 | 0 | 1 | 0 | 1 | 1 |
| 5 | 0 | 1 | 1 | 0 | 1 | 0 | 1 | 1 |
| 6 | 0 | 1 | 1 | 0 | 1 | 1 | 1 | 1 |
| 7 | 1 | 1 | 1 | 0 | 1 | 1 | 1 | 1 |

FIG. 12

| PROJECTOR | ORDER OF SUB-FRAMES SF IN WHICH DATA VALUE BECOMES 1 WITHIN ONE FRAME PERIOD | | | | | | |
|---|---|---|---|---|---|---|---|
| | 1st | 2nd | 3rd | 4th | 5th | 6th | 7th |
| 11 | SF1 | SF4 | SF7 | SF2 | SF5 | SF8 | SF3 |
| 12 | SF3 | SF6 | SF1 | SF4 | SF7 | SF2 | SF5 |
| 13 | SF5 | SF8 | SF3 | SF6 | SF1 | SF4 | SF7 |
| 14 | SF7 | SF2 | SF5 | SF8 | SF3 | SF6 | SF1 |

FIG. 13

| GRADATION VALUE | PROJECTOR | SUB-FRAME NUMBER | | | | | | | |
|---|---|---|---|---|---|---|---|---|---|
| | | SF1 | SF2 | SF3 | SF4 | SF5 | SF6 | SF7 | SF8 |
| 0 | 11 | 0 | 0 | 0 | 0 | 0 | 0 | 0 | 0 |
| | 12 | 0 | 0 | 0 | 0 | 0 | 0 | 0 | 0 |
| | 13 | 0 | 0 | 0 | 0 | 0 | 0 | 0 | 0 |
| | 14 | 0 | 0 | 0 | 0 | 0 | 0 | 0 | 0 |
| 1 | 11 | 1 | 0 | 0 | 0 | 0 | 0 | 0 | 0 |
| | 12 | 0 | 0 | 1 | 0 | 0 | 0 | 0 | 0 |
| | 13 | 0 | 0 | 0 | 0 | 1 | 0 | 0 | 0 |
| | 14 | 0 | 0 | 0 | 0 | 0 | 0 | 1 | 0 |
| 2 | 11 | 1 | 0 | 0 | 1 | 0 | 0 | 0 | 0 |
| | 12 | 0 | 0 | 1 | 0 | 0 | 1 | 0 | 0 |
| | 13 | 0 | 0 | 0 | 0 | 1 | 0 | 0 | 1 |
| | 14 | 0 | 1 | 0 | 0 | 0 | 0 | 1 | 0 |
| 3 | 11 | 1 | 0 | 0 | 1 | 0 | 0 | 1 | 0 |
| | 12 | 1 | 0 | 1 | 0 | 0 | 1 | 0 | 0 |
| | 13 | 0 | 0 | 1 | 0 | 1 | 0 | 0 | 1 |
| | 14 | 0 | 1 | 0 | 0 | 1 | 0 | 1 | 0 |
| 4 | 11 | 1 | 1 | 0 | 1 | 0 | 0 | 1 | 0 |
| | 12 | 1 | 0 | 1 | 1 | 0 | 1 | 0 | 0 |
| | 13 | 0 | 0 | 1 | 0 | 1 | 1 | 0 | 1 |
| | 14 | 0 | 1 | 0 | 0 | 1 | 0 | 1 | 1 |
| 5 | 11 | 1 | 1 | 0 | 1 | 1 | 0 | 1 | 0 |
| | 12 | 1 | 0 | 1 | 1 | 0 | 1 | 1 | 0 |
| | 13 | 1 | 0 | 1 | 0 | 1 | 1 | 0 | 1 |
| | 14 | 0 | 1 | 1 | 0 | 1 | 0 | 1 | 1 |
| 6 | 11 | 1 | 1 | 0 | 1 | 1 | 0 | 1 | 1 |
| | 12 | 1 | 1 | 1 | 1 | 0 | 1 | 1 | 0 |
| | 13 | 1 | 0 | 1 | 1 | 1 | 1 | 0 | 1 |
| | 14 | 0 | 1 | 1 | 0 | 1 | 1 | 1 | 1 |
| 7 | 11 | 1 | 1 | 1 | 1 | 1 | 0 | 1 | 1 |
| | 12 | 1 | 1 | 1 | 1 | 1 | 1 | 1 | 0 |
| | 13 | 1 | 0 | 1 | 1 | 1 | 1 | 1 | 1 |
| | 14 | 1 | 1 | 1 | 0 | 1 | 1 | 1 | 1 |

PROJECTOR SYSTEM AND CAMERA

CROSS REFERENCE TO RELATED APPLICATION

This application is a Continuation of PCT Application No. PCT/JP2018/040133, filed on Oct. 29, 2018, and claims the priority of Japanese Patent Application No. 2017-250532, filed on Dec. 27, 2017, the entire contents of both of which are incorporated herein by reference.

BACKGROUND

The present disclosure relates to a projector system and a camera evaluation system.

When a camera as disclosed in Japanese Unexamined Patent Application Publication No. 2004-247979 is newly developed, the camera is generally evaluated by photographing different places with the camera under development.

SUMMARY

Therefore, since it takes time to perform the evaluation, and the photographing conditions vary depending on the weather, photographing time, and the like, even in the same place, it is difficult to evaluate the camera with high reproducibility.

A first aspect of one or more embodiments provides a projector system including: a plurality of projectors for generating an image based on the input video data and superimposing the image to display a display image, wherein the plurality of projectors include a video data processor for converting the video data into sub-frame data in which one frame is composed of a plurality of sub-frames, and a liquid crystal display device for switching the images for each frame based on the sub-frame data and displaying the images in a frame sequential manner, and the video data processor includes a different sub-frame data conversion table for each of the plurality of projectors, and a sub-frame data generator for converting the video data into the sub-frame data based on the sub-frame data conversion table.

A second aspect of one or more embodiments provides a camera evaluation system including: the above-described projector system, and a data analysis device for analyzing detection result data generated based on a captured image obtained by capturing the display image by a camera.

BRIEF DESCRIPTION OF THE DRAWINGS

FIG. 4A is a diagram illustrating an example of a sub-frame data conversion table according to Example 1.

FIG. 4B is a diagram illustrating an example of the sub-frame data conversion table according to Example 1.

FIG. 4C is a diagram illustrating an example of the sub-frame data conversion table according to Example 1.

FIG. 4D is a diagram illustrating an example of the sub-frame data conversion table according to Example 1.

FIG. 5 is a diagram illustrating the order of sub-frames in which the data value for each projector becomes 1 within one frame period.

FIG. 6 is a diagram illustrating a relationship between a plurality of projectors and data values of sub-frames at each gradation value.

FIG. 11A is a diagram illustrating an example of a sub-frame data conversion table according to Example 2.

FIG. 11B is a diagram illustrating an example of the sub-frame data conversion table according to Example 2.

FIG. 11C is a diagram illustrating an example of the sub-frame data conversion table according to Example 2.

FIG. 11D is a diagram illustrating an example of the sub-frame data conversion table according to Example 2.

FIG. 12 is a diagram illustrating the order of sub-frames in which the data value for each projector becomes 1 within one frame period.

FIG. 13 is a diagram illustrating a relationship between a plurality of projectors and data values of sub-frames at each gradation value.

DETAILED DESCRIPTION

Figure 1:
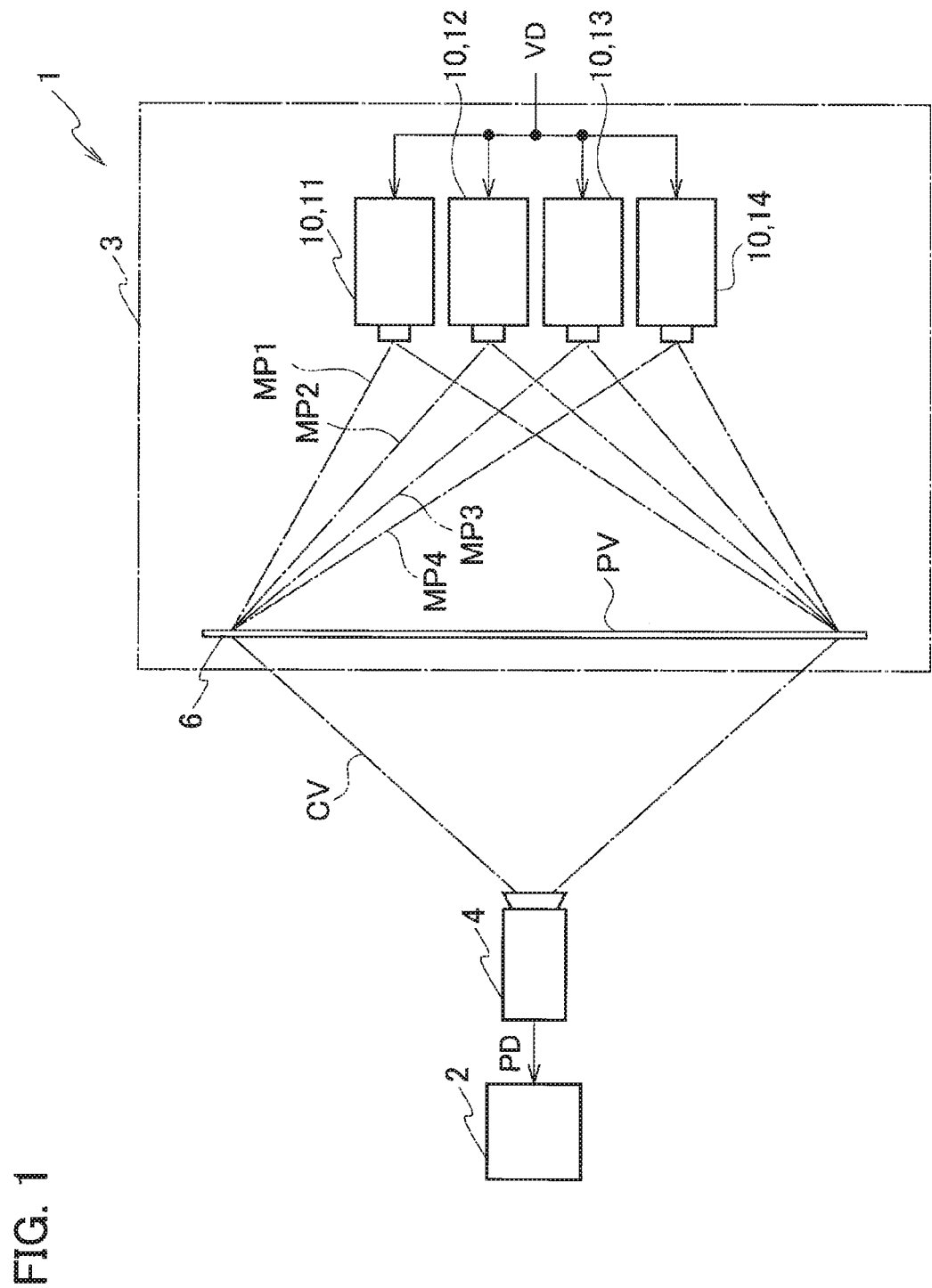
FIG. 1 is a configuration diagram illustrating a projector system and a camera evaluation system according to one or more embodiments.

A projector system and a camera evaluation system according to one or more embodiments will be described with reference to FIG. 1. A camera evaluation system 1 for evaluating a camera 4 to be evaluated includes a data analysis device 2 and a projector system 3. The projector system 3 includes a plurality of projectors 10 and a screen 6. FIG. 1 illustrates four projectors 11 to 14 arranged in a vertical direction as the plurality of projectors 10 for easy understanding.

To the projectors 11 to 14 configuring the projector system 3, images captured under various types of conditions at different places, at different times, in different weather, or in different seasons are input as video data VD. The projector 11 generates an image MP1 based on the video data VD and projects the image MP1 on the screen 6. The projector 12 generates an image MP2 based on the video data VD and projects the image MP2 on the screen 6. The projector 13 generates an image MP3 based on the video data VD and projects the image MP3 on the screen 6. The projector 14 generates an image MP4 based on the video data VD and projects the image MP4 on the screen 6.

The images MP1 to MP4 are synchronized and superimposed on the screen 6 by the projectors 11 to 14, and displayed as a display image PV. A method for generating the images MP1 to MP4 will be described later.

The camera 4 to be evaluated captures the display image PV displayed on the screen 6 as a captured image CV. When the camera 4 is an in-vehicle camera, the camera 4 detects, for example, a center line on a road based on the captured image CV, generates detection result data PD, and outputs the detection result data PD to the data analysis device 2. The data analysis device 2 analyzes the detection result data PD. The camera 4 is evaluated based on the analysis result.

The projector 10 will be described with reference to FIG. 2. The projector 10 includes a video data processor 100 and a liquid crystal display device 20. The video data processor 100 may be configured by software executed by a central processor (CPU), or may be configured by hardware such as a circuit.

The video data VD is input to the video data processor 100 as a digital signal. The video data processor 100 converts the video data VD into sub-frame data SFD in which one frame is composed of a plurality of sub-frames. The video data processor 100 sequentially outputs the sub-frame data SFD to the liquid crystal display device 20 in pixel units. The operation of the video data processor 100 will be described later.

The liquid crystal display device 20 is a frame-sequential active matrix liquid crystal display device that switches and displays the image MP for each frame. The liquid crystal display device 20 includes a horizontal scanning circuit 21, a vertical scanning circuit 22, and a display pixel unit 23. The sub-frame data SFD is sequentially input to the horizontal scanning circuit 21 from the video data processor 100 in pixel units.

The horizontal scanning circuit 21 is connected to a plurality (x) of column data lines D (D1 to Dx) arranged in the horizontal direction. The vertical scanning circuit 22 is connected to a plurality (y) of row scanning lines G (G1 to Gy) arranged in the vertical direction. FIG. 2 shows only two column data lines D1 and Dx, and two row scanning lines G1 and Gy.

The display pixel unit 23 includes a plurality of (x×y) pixels 30 arranged in a matrix at each intersection of a column data line D and a row scanning line G. FIG. 2 shows only four pixels 30 by associating it with the two column data lines D1 and Dx and the two row scanning lines G1 and Gy.

The pixel 30 includes a switching unit 31 (first switching unit), a sampling-and-holding unit 32 (first sampling-and-holding unit), a switching unit 33 (second switching unit), a sampling-and-holding unit 34 (second sampling-and-holding unit), and a liquid crystal display element 40.

The liquid crystal display element 40 includes a reflective electrode 41, a common electrode 42, and a liquid crystal 43. The reflective electrode 41 is formed for each pixel 30. The common electrode 42 is formed in common for all of the pixels 30. The liquid crystal 43 is filled in a gap (cell gap) between the reflective electrode 41 and the common electrode 42.

The switching units 31 and 33 are configured by N-channel MOS type field effect transistors (hereinafter, referred to as NMOS transistors). The switching unit 31 has a gate connected to the row scanning line G, a drain connected to the column data line D, and a source connected to the input side of the sampling-and-holding unit 32.

The sampling-and-holding unit 32 is configured by a flip-flop having a static random access memory (SRAM) structure, and is connected to the row scanning line G. The sampling-and-holding unit 32 is connected to the column data line D via the switching unit 31.

The switching unit 33 has a gate connected to a control signal line CL, a drain connected to the output side of the sampling-and-holding unit 32, and a source connected to the input side of the sampling-and-holding unit 34. The sampling-and-holding unit 34 is configured by a flip-flop having an SRAM structure, and the output side thereof is connected to the reflective electrode 41 of the liquid crystal display element 40. The common electrode 42 is connected to a common terminal CT.

The operation of the liquid crystal display device 20 will be described. A vertical synchronization signal VST and a vertical shift clock signal VCK are input to the vertical scanning circuit 22 from the video data processor 100. The vertical scanning circuit 22 generates a row selection signal SS based on the vertical synchronization signal VST and the vertical shift clock signal VCK and selects a row scanning line G every horizontal period. The switching units 31 for one pixel row connected to the selected row scanning line G are simultaneously turned on by the row selection signal SS. Sub-frame data SFD having a plurality of sub-frames forming one frame is sequentially input to the horizontal scanning circuit 21 from the video data processor 100 in pixel units. A horizontal synchronization signal HST and a horizontal shift clock signal HCK are input to the horizontal scanning circuit 21 from the video data processor 100.

The horizontal scanning circuit 21 outputs the sub-frame data SFD to the column data lines D1 to Dx based on the horizontal synchronization signal HST and the horizontal shift clock signal HCK. Thus, the sub-frame data SFD corresponding to each pixel 30 is written to the sampling-and-holding unit 32 of each pixel 30 of the pixel row selected by the vertical scanning circuit 22 via the switching unit 31.

The sampling-and-holding unit 32 samples and holds the sub-frame data SFD. When all the pixel rows are selected by the vertical scanning circuit 22, the video data for one sub-frame comes to be written to the sampling-and-holding units 32 of all the pixels 30. The switching unit 31 and the sampling-and-holding unit 32 constitute a first holding means.

When the sub-frame data SFD is written to the sampling-and-holding units 32 of all the pixels 30, the video data processor 100 outputs a control signal CS to the switching units 33 of all the pixels 30 via the control signal line CL. As a result, the switching units 33 of all of the pixels 30 are turned on and the sub-frame data SFD for one sub-frame written to the sampling-and-holding unit 32 is simultaneously transmitted to the corresponding sampling-and-holding unit 34 for all the pixels 30. The switching unit 33 constitutes a transfer means.

The sampling-and-holding unit 34 samples and holds the sub-frame data SFD for one sub-frame. The sub-frame data SFD for one sub-frame is held in each sampling-and-holding unit 34 only during one sub-frame period. The sampling-and-holding unit 34 constitutes a second holding means.

A drive voltage corresponding to the sub-frame data SFD is applied to the reflective electrode 41 of the liquid crystal display element 40 by the sampling-and-holding unit 34. The drive voltage applied to the reflective electrode 41 is the ground voltage of the MOS transistor when the sub-frame data SFD held by the sampling-and-holding unit 34 is "0", and is the power supply voltage of the MOS transistor when the sub-frame data SFD is "1". A common voltage is applied to all the pixels 30 from a common terminal CT to the common electrode 42 of the liquid crystal display element 40.

The liquid crystal 43 is driven according to the potential difference between the reflective electrode 41 and the common electrode 42. When illumination light is applied to the display pixel unit 23 from outside, the illumination light is modulated for each pixel 30 and displayed as an image.

The liquid crystal display device 20 holds the sub-frame data SFD for one sub-frame in the sampling-and-holding units 34 of all the pixels 30 during one sub-frame period. The liquid crystal display device 20 sequentially writes the sub-frame data SFD for the next one sub-frame to the sampling-and-holding units 32 of all the pixels 30 within one sub-frame period. Thereby, the liquid crystal display device 20 can display the image MP in a frame-sequential manner.

It is assumed that only the evaluation result PD is output from the camera 4 to be evaluated and a signal such as a video signal or a synchronization signal required for synchronizing an external device is not output. It is also assumed that the camera 4 does not have a function of inputting a synchronization signal from an external device and synchronizing the camera 4 with the external device. Therefore, the projector 10 and the camera 4 are not easily synchronized.

Therefore, assuming that the camera 4 and the plurality of projectors 11 to 14 are asynchronous, the configuration of the plurality of projectors 11 to 14 and the method of generating the sub-frame data SFD by the plurality of projectors 11 to 14, which enable the camera 4 to capture the images MP1 to MP4 (display images PV) projected from the plurality of projectors 11 to 14 with good reproducibility, will be described as in Examples 1 and 2.

Example 1

Figure 2:
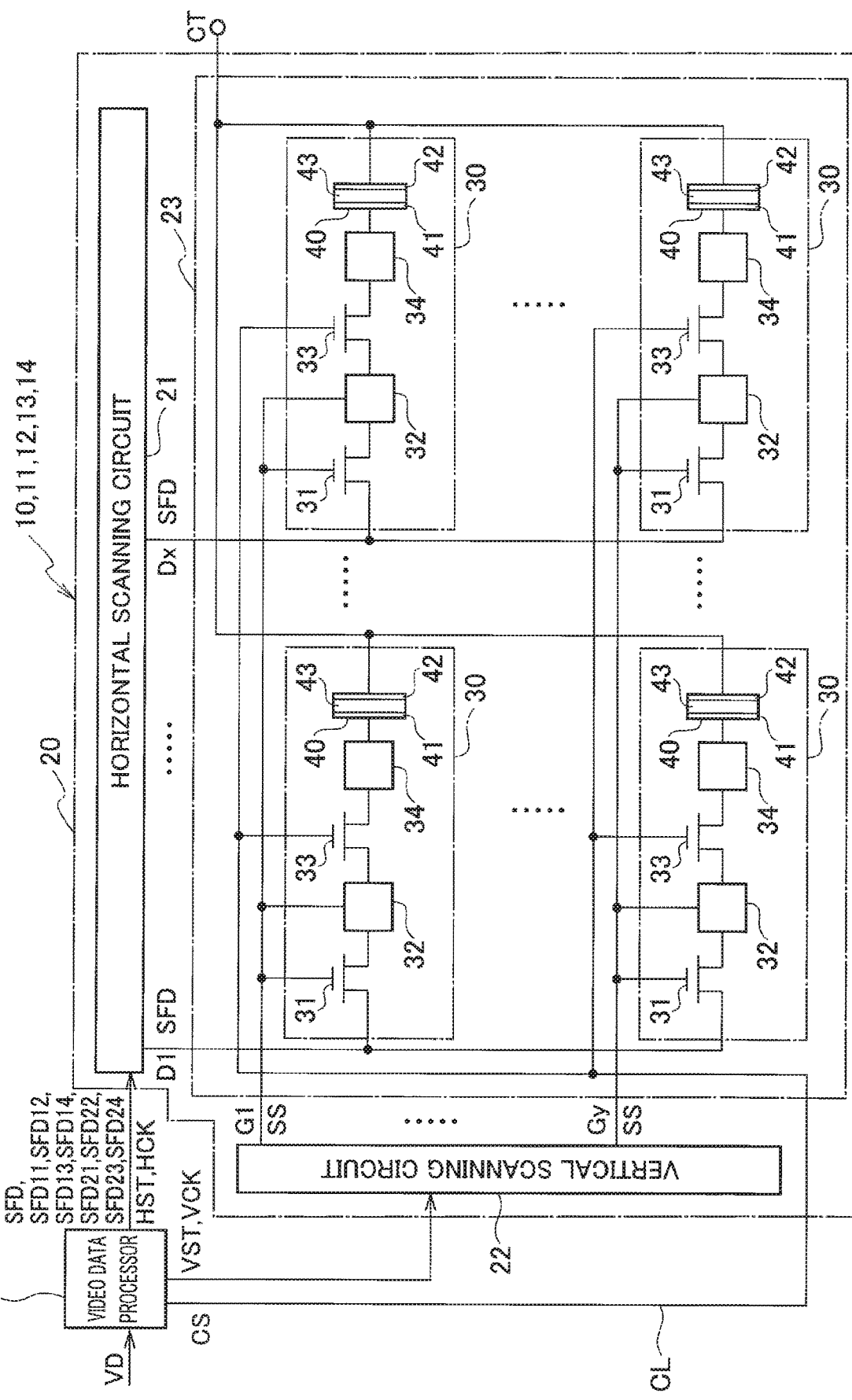
FIG. 2 is a configuration diagram illustrating a projector in the projector system and the camera evaluation system according to one or more embodiments.

The projectors 11 to 14 are different in the configuration of the video data processors 111 to 114 shown in FIG. 2 and the method of generating the pieces of sub-frame data SFD11 to SFD14 in the video data processors 111 to 114, and the configurations and operations other than the above are the same. The video data processors 111 to 114 correspond to the above described video data processor 100 and the pieces of sub-frame data SFD11 to SFD14 correspond to the above described sub-frame data SFD.

Figure 3:
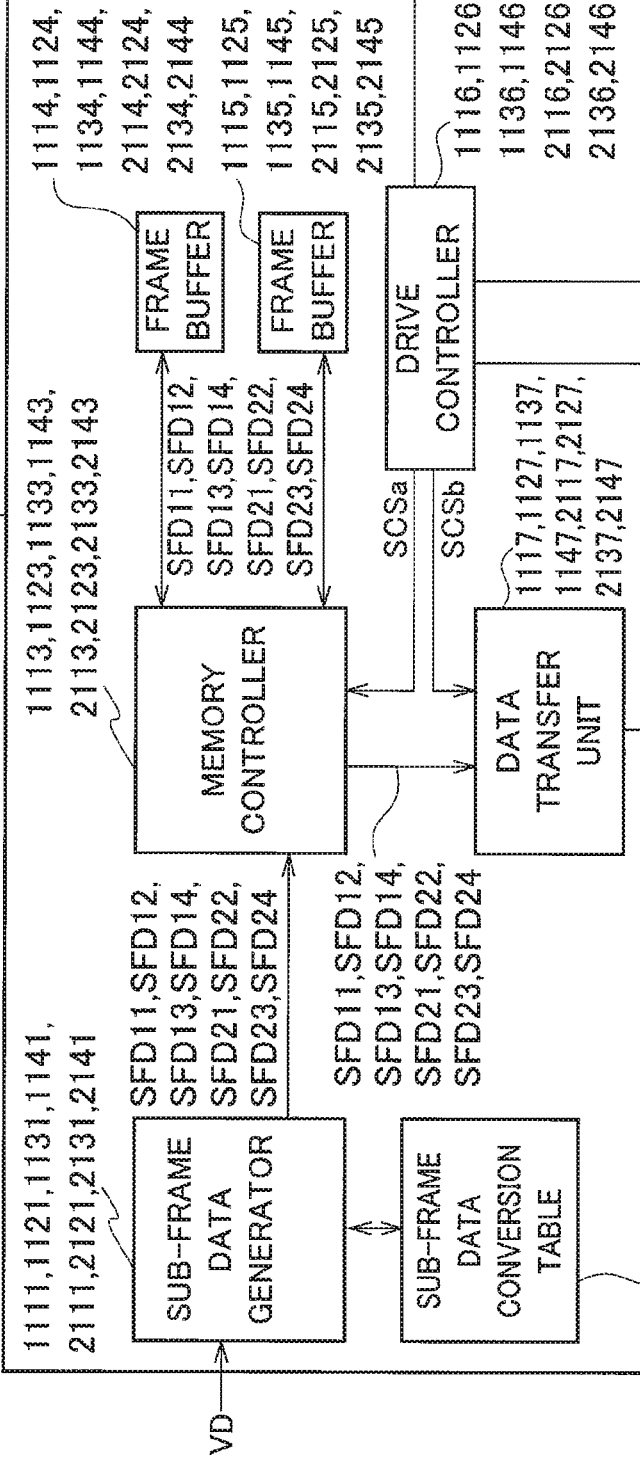
FIG. 3 is a configuration diagram illustrating a video data processor according to Examples 1 and 2.
Figure 3:
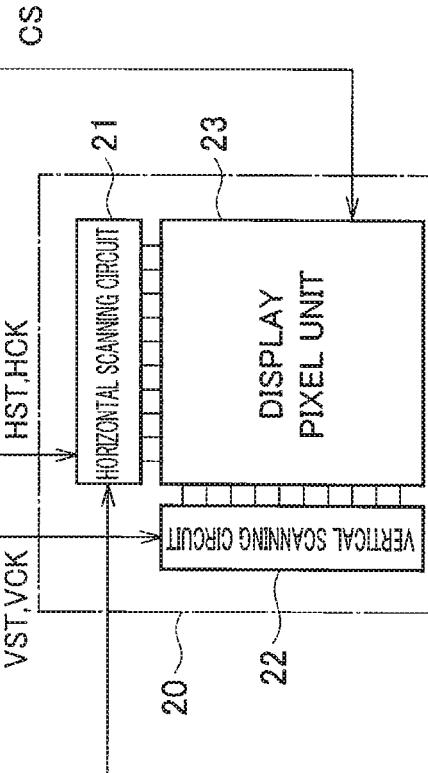

The projector 11 includes a video data processor 111. As shown in FIG. 3, the video data processor 111 includes a sub-frame data generator 1111, a sub-frame data conversion table 1112, a memory controller 1113, frame buffers 1114 and 1115, a drive controller 1116, and a data transfer unit 1117.

Video data VD is input to the sub-frame data generator 1111. The video data VD is n-bit gradation data. The sub-frame data generator 1111 converts the video data VD into sub-frame data SFD11 composed of $2^n$ sub-frames SF based on the sub-frame data conversion table 1112 and outputs the sub-frame data SFD11 to the memory controller 1113.

The memory controller 1113 sequentially writes the sub-frame data SFD11 to one frame buffer 1114. When the sub-frame data SFD11 for one sub-frame is written to the frame buffer 1114, the memory controller 1113 writes the sub-frame data SFD11 for the next one sub-frame to the other frame buffer 1115, and the sub-frame data SFD11 for one sub-frame written to the frame buffer 1114 is read and output to the data transfer unit 1117.

With the double buffer configuration including the frame buffers 1114 and 1115, the memory controller 1113 can alternately write and read the sub-frame data SFD11 to and from the frame buffers 1114 and 1115. The data transfer unit 1117 outputs the sub-frame data SFD11 to the horizontal scanning circuit 21.

The drive controller 1116 outputs a synchronization control signal SCSa to the memory controller 1113 and outputs a synchronization control signal SCSb to the data transfer unit 1117. The drive controller 1116 outputs the vertical synchronization signal VST and the vertical shift clock signal VCK to the vertical scanning circuit 22 and outputs the horizontal synchronization signal HST and the horizontal shift clock signal HCK to the horizontal scanning circuit 21.

The drive controller 1116 controls the operation timing of the memory controller 1113, the data transfer unit 1117, the vertical scanning circuit 22, and the horizontal scanning circuit 21 by using the synchronization control signals SCSa and SCSb, the vertical synchronization signal VST, the vertical shift clock signal VCK, the horizontal synchronization signal HST and the horizontal shift clock signal HCK. Thus, the sub-frame data SFD11 is input to each pixel 30 included in the display pixel unit 23.

The projector 12 includes a video data processor 112. The video data processor 112 includes a sub-frame data generator 1121, a sub-frame data conversion table 1122, a memory controller 1123, frame buffers 1124 and 1125, a drive controller 1126, and a data transfer unit 1127.

The projector 13 includes a video data processor 113. The video data processor 113 includes a sub-frame data generator 1131, a sub-frame data conversion table 1132, a memory controller 1133, frame buffers 1134 and 1135, a drive controller 1136, and a data transfer unit 1137.

The projector 14 includes a video data processor 114. The video data processor 114 includes a sub-frame data generator 1141, a sub-frame data conversion table 1142, a memory controller 1143, frame buffers 1144 and 1145, a drive controller 1146, and a data transfer unit 1147.

The video data VD is input to the sub-frame data generators 1121, 1131, and 1141. The sub-frame data generator 1121 converts the video data VD into sub-frame data SFD12 composed of $2^n$ sub-frames SF based on the sub-frame data conversion table 1122 and outputs the sub-frame data SFD12 to the memory controller 1123.

The sub-frame data generator 1131 converts the video data VD into sub-frame data SFD13 composed of $2^n$ sub-frames SF based on the sub-frame data conversion table 1132 and outputs the sub-frame data SFD13 to the memory controller 1133.

The sub-frame data generator 1141 converts the video data VD into sub-frame data SFD14 composed of $2^n$ sub-frames SF based on the sub-frame data conversion table 1142 and outputs the sub-frame data SFD14 to the memory controller 1143.

The memory controllers 1123, 1133, and 1143 execute the same processing as the memory controller 1113. The frame buffers 1124 and 1125, the frame buffers 1134 and 1135, and the frame buffers 1144 and 1145 execute the same processing as the frame buffers 1114 and 1115. The drive controllers 1126, 1136, and 1146 execute the same processing as the drive controller 1116. The data transfer units 1127, 1137, and 1147 execute the same processing as the data transfer unit 1117.

FIGS. 4A to 4D illustrate an example of the relationship between the gradation values and the data values of the sub-frame SF in the sub-frame data conversion tables 1112, 1122, 1132, and 1142. Reference numerals SF1 to SF8 shown in FIGS. 4A to 4D indicate sub-frame numbers, and the data value of the sub-frame SF for each gradation value is shown as 0 or 1.

A data value of 1 corresponds to a display period in the pixel 30, and a data value of 0 corresponds to a non-display period in the pixel 30. FIGS. 4A to 4D show a case where the number of gradations is eight and one frame is composed of eight sub-frames SF for easy understanding. The number of gradations and the number of sub-frames are not limited to those in Example 1, and are set as appropriate.

The sub-frame data conversion tables 1112, 1122, 1132, and 1142 are set so that the sub-frame numbers at which the gradation values increase first are different. For example, as shown in FIG. 4A, the sub-frame data conversion table 1112 is set so that the gradation value increases from the sub-frame SF1. As shown in FIG. 4B, the sub-frame data conversion table 1122 is set so that the gradation value increases from the sub-frame SF3.

As shown in FIG. 4C, the sub-frame data conversion table 1132 is set so that the gradation value increases from the sub-frame SF5. As shown in FIG. 4D, the sub-frame data conversion table 1142 is set so that the gradation value increases from the sub-frame SF7.

FIG. 5 shows the order of the sub-frames SF in which the data values become 1 in the projectors 11 to 14. FIG. 6 shows the relationship between the projectors 11 to 14 and the data values of the sub-frames SF at each gradation value based on FIGS. 4A to 4D.

For example, when the gradation value is 2, the projector 11 displays an image in which the period of the sub-frames SF1 and SF2 is a display period. The projector 12 displays an image in which the period of the sub-frames SF3 and SF4 is a display period. The projector 13 displays an image in which the period of the sub-frames SF5 and SF6 is a display period. The projector 14 displays an image in which the period of the sub-frames SF7 and SF8 is a display period. That is, the sub-frames SF1 to SF8 constituting one frame are a display period in any one of the projectors 11 to 14. Therefore, the display image PV in which all of the sub-frames SF1 to SF8 are in the display period is displayed on the screen 6.

Figure 7:
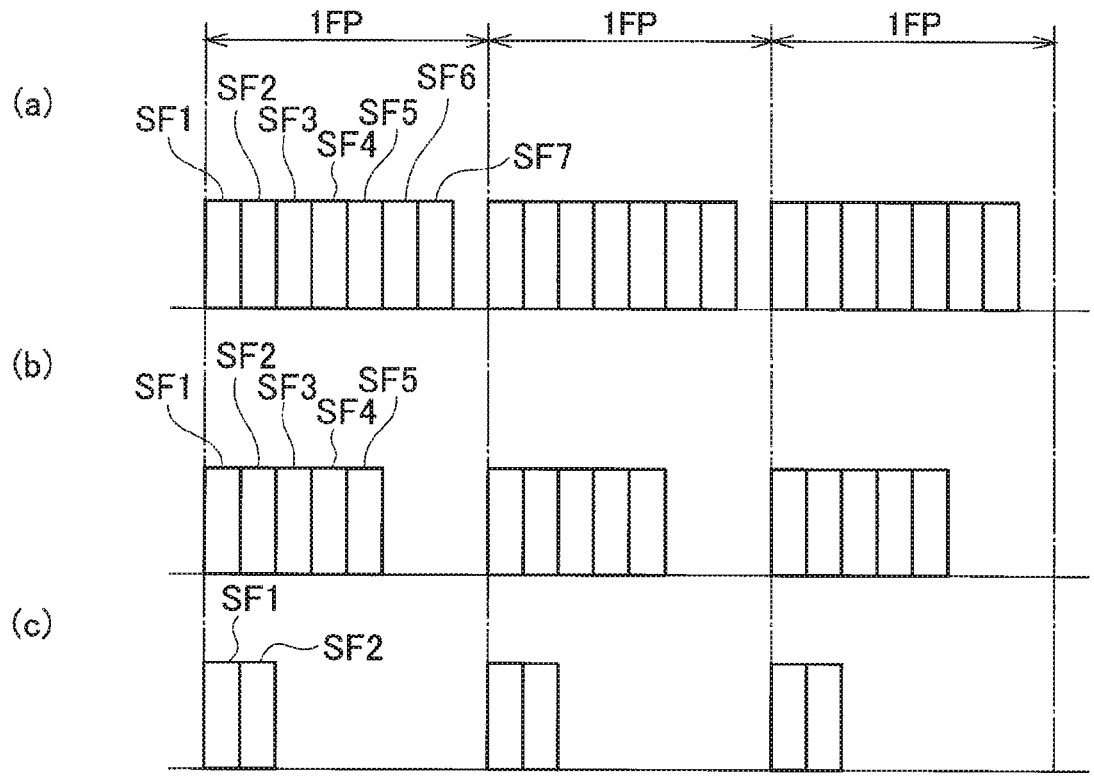
FIG. 7 is a diagram illustrating a case where a plurality of projectors convert video data into sub-frame data based on the same sub-frame data conversion table.

As a comparative example of Example 1, a case where the projectors 11 to 14 convert the video data VD into the sub-frame data SFD based on the same sub-frame data conversion table will be described. (a) to (c) of FIG. 7 show a case where the projectors 11 to 14 convert the video data VD into the sub-frame data SFD based on the sub-frame data conversion table 1112 shown in FIG. 4A. (a) of FIG. 7 shows the sub-frame data SFD when the gradation value is 7. (b) of FIG. 7 shows the sub-frame data SFD when the gradation value is 5. (c) of FIG. 7 shows the sub-frame data SFD when the gradation value is 2.

Figure 8:
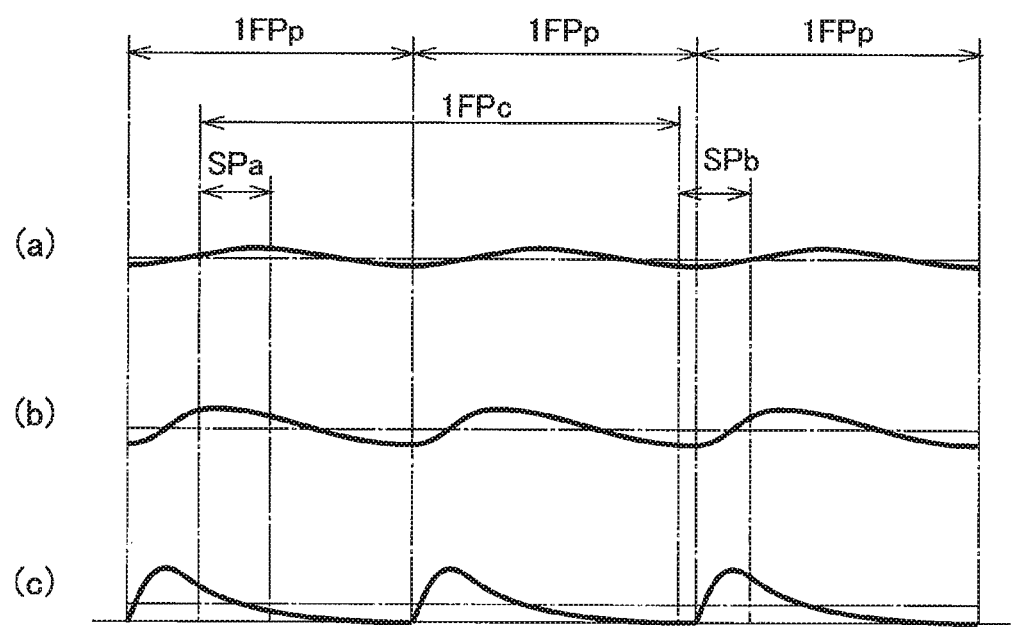
FIG. 8 is a diagram illustrating a response characteristic of the liquid crystal to the sub-frame data illustrated in FIG. 7.

(a) to (c) of FIG. 8 show the response characteristics of the liquid crystal 43 to the sub-frame data SFD. In (a) to (c) of FIG. 8, the vertical axis represents the intensity of the output light of the liquid crystal 43, and the horizontal axis represents the frame period of the projectors 11 to 14 and the camera 4, and the exposure time of the camera 4. A reference numeral "1FPp" shown in (a) to (c) of FIG. 8 indicates one frame period of the projectors 11 to 14. The reference numeral 1FPp corresponds to 1FP shown in FIG. 7. The reference numeral 1FPc indicates one frame period of the camera 4. The reference numerals SPa and SPb indicate the exposure time of the camera 4. (a) to (c) of FIG. 8 respectively correspond to (a) to (c) of FIG. 7.

As shown in (a) of FIG. 8 when the gradation value is high, the display period of the sub-frame SF in one frame is long, and accordingly the pulsation of the liquid crystal 43 (fluctuation in the intensity of the output light in one frame period) is small. On the other hand, as shown in FIG. 8C, when the gradation value is low, the display period of the sub-frame SF in one frame is short, and accordingly the pulsation of the liquid crystal 43 is large. As shown in (b) of FIG. 8, the pulsation of the liquid crystal 43 has an intermediate magnitude at an intermediate gradation value.

When the camera 4 is used as an outdoor camera such as an in-vehicle camera or a wirelessly controlled drone, which is referred to as a drone, photographing is performed in a bright environment outdoors compared to indoors. When photographing is performed in a bright environment, the exposure time of the camera 4 becomes short. Therefore, when the camera 4 and the projectors 11 to 14 are asynchronous, as shown in (a) to (c) of FIG. 8, the image captured at the exposure time SPa and the image captured at the exposure time SPb have different exposure amounts. In particular, when the number of gradations is small as shown in (c) of FIG. 8, the difference in the exposure amount becomes large.

As a result, in accordance with the pulsation response of the liquid crystal 43, a phenomenon called a beat, such as a luminance variation for each frame or a light and dark stripe, occurs in the image captured by the camera 4. The beat becomes more conspicuous as the gradation value is small and the exposure time SP is short.

On the other hand, the projectors 11 to 14 of Example 1 convert the video data VD into pieces of sub-frame data SFD11, SFD12, SFD13, and SFD14 based on different sub-frame data conversion tables 1112, 1122, 1132, and 1142.

Figure 9:
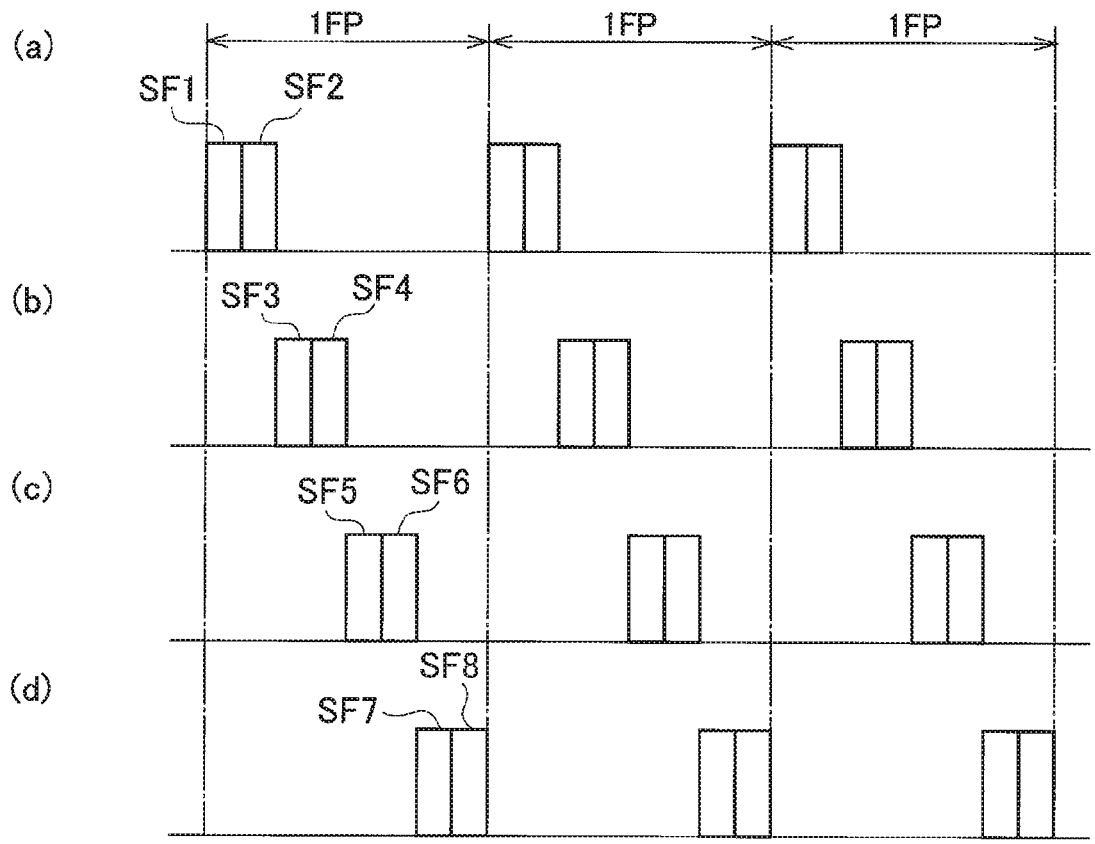
FIG. 9 is a diagram illustrating a case where a plurality of projectors convert video data into sub-frame data based on different sub-frame data conversion tables.

(a) to (d) of FIG. 9 show a case where the projectors 11 to 14 convert the video data VD into the pieces of sub-frame data SFD11, SFD12, SFD13, and SFD14 based on the sub-frame data conversion tables 1112, 1122, 1132 and 1142 shown in FIGS. 4A to 4D. (a) to (d) of FIG. 9 show the pieces of sub-frame data SFD11 to SFD14 when the gradation value is 2.

The projectors 11 to 14 convert the video data VD based on the different sub-frame data conversion tables 1112, 1122, 1132, and 1142 into the pieces of sub-frame data SFD11, SFD12, SFD13, and SFD14 in which the timing of the display period of the sub-frame SF is different for each of the projectors 11 to 14.

Figure 10:
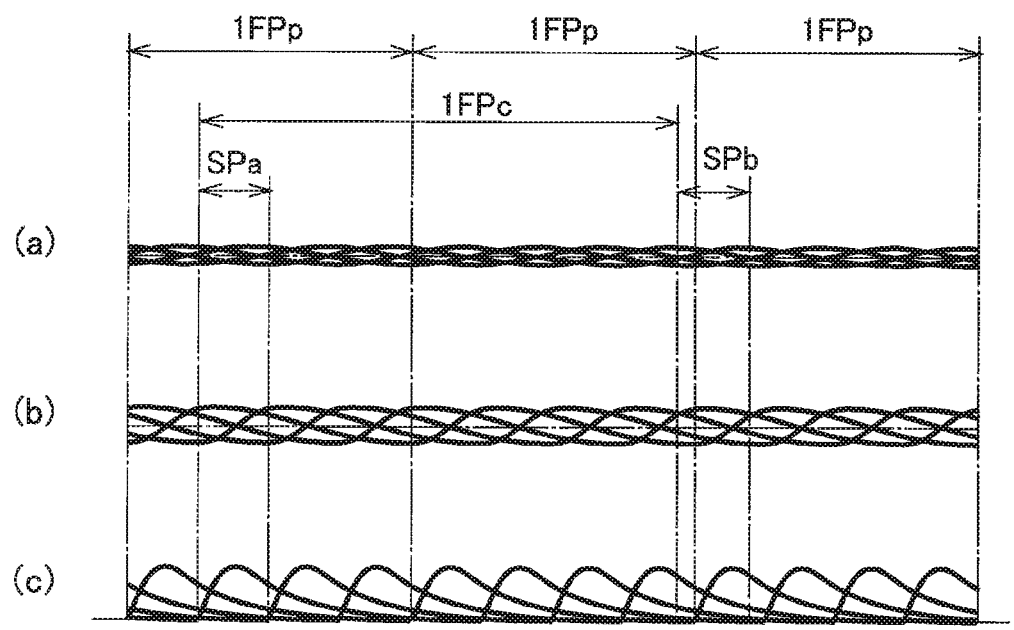
FIG. 10 is a diagram illustrating response characteristics of the liquid crystal to the sub-frame data of the plurality of projectors illustrated in FIG. 9.

(a) to (c) of FIG. 10 show the response characteristics of the liquid crystal 43 to the pieces of sub-frame data SFD11 to SFD14 of the projectors 11 to 14. (a) to (c) of FIG. 10 correspond to (a) to (c) of FIG. 8. The projectors 11 to 14 use different sub-frame data conversion tables 1112, 1122, 1132, and 1142 to cause the timing of the display period of the sub-frame SF to differ for each of the projectors 11 to 14. Thereby, the timing of the pulsation response of the liquid crystal 43 can be dispersed. Therefore, it is possible to reduce the difference in the exposure amount between the image captured at the exposure time SPa and the image captured at the exposure time SPb. Thereby, the occurrence of a beat can be suppressed.

Example 2

The projectors 11 to 14 are different in the configuration of video data processors 211 to 214 shown in FIG. 2 and the method of generating pieces of sub-frame data SFD21 to SFD24 in video data processors 211 to 214, and configurations and operations other than the above are the same. The video data processors 211 to 214 correspond to the video data processor 100, and the pieces of sub-frame data SFD21 to SFD24 correspond to the sub-frame data SFD.

The projector 11 includes a video data processor 211. As shown in FIG. 3, the video data processor 211 includes a sub-frame data generator 2111, a sub-frame data conversion table 2112, a memory controller 2113, frame buffers 2114 and 2115, a drive controller 2116, and a data transfer unit 2117.

The projector 12 includes a video data processor 212. The video data processor 212 includes a sub-frame data generator 2121, a sub-frame data conversion table 2122, a memory controller 2123, frame buffers 2124 and 2125, a drive controller 2126, and a data transfer unit 2127.

The projector 13 includes a video data processor 213. The video data processor 213 includes a sub-frame data generator 2131, a sub-frame data conversion table 2132, a memory controller 2133, frame buffers 2134 and 2135, a drive controller 2136, and a data transfer unit 2137.

The projector 14 includes a video data processor 214. The video data processor 214 includes a sub-frame data generator 2141, a sub-frame data conversion table 2142, a memory controller 2143, frame buffers 2144 and 2145, a drive controller 2146, and a data transfer unit 2147.

Video data VD is input to the sub-frame data generators 2111, 2121, 2131, and 2141. The video data VD is n-bit gradation data. The sub-frame data generator 2111 converts the video data VD into sub-frame data SFD21 composed of $2^n$ sub-frames SF based on the sub-frame data conversion table 2112 and outputs the sub-frame data SFD21 to the memory controller 2113.

The sub-frame data generator 2121 converts the video data VD into sub-frame data SFD22 composed of $2^n$ sub-frames SF based on the sub-frame data conversion table 2122 and outputs the sub-frame data SFD22 to the memory controller 2123.

The sub-frame data generator 2131 converts the video data VD into sub-frame data SFD23 composed of $2^n$ sub-frames SF based on the sub-frame data conversion table 2132 and outputs the sub-frame data SFD23 to the memory controller 2133.

The sub-frame data generator 2141 converts the video data VD into sub-frame data SFD24 composed of $2^n$ sub-frames SF based on the sub-frame data conversion table 2142 and outputs the sub-frame data SFD24 to the memory controller 2143.

The memory controllers 2113, 2123, 2133, and 2143 execute the same processing as the memory controllers 1113, 1123, 1133, and 1143. The frame buffers 2114 and 2115, the frame buffers 2124 and 2125, the frame buffers 2134 and 2135, and the frame buffers 2144 and 2145 execute the same processing respectively as the frame buffers 1114 and 1115, the frame buffers 1124 and 1125, the frame buffers 1134 and 1135, and the frame buffers 1144 and 1145.

The drive controllers 2116, 2126, 2136, and 2146 execute the same processing as the drive controllers 1116, 1126, 1136, and 1146. The data transfer units 2117, 2127, 2137, and 2147 execute the same processing as the data transfer units 1117, 1127, 1137, and 1147.

FIGS. 11A to 11D show an example of the relationship between the gradation values and the data values of the sub-frames SF in the sub-frame data conversion tables 2112, 2122, 2132, and 2142. The reference numerals SF1 to SF8 shown in FIGS. 11A to 11D indicate sub-frame numbers, and the data value of the sub-frame SF for each gradation value is shown as 0 or 1.

A data value of 1 corresponds to a display period in the pixel 30, and a data value of 0 corresponds to a non-display period in the pixel 30. FIGS. 11A to 11D show a case where the number of gradations is eight and one frame is composed of eight sub-frames SF for easy understanding. The number of gradations and the number of sub-frames are not limited to those in Example 2, and are set as appropriate.

The sub-frame data conversion tables 2112, 2122, 2132, and 2142 are set so that the timing of the display period of the sub-frame SF is different for each of the projectors 11 to 14. For example, as shown in FIG. 11A, the sub-frame data conversion table 2112 is set so that the gradation value of the sub-frame SF1 increases first. As shown in FIG. 11B, the sub-frame data conversion table 2122 is set so that the gradation value of the sub-frame SF3 increases first.

As shown in FIG. 11C, the sub-frame data conversion table 2132 is set so that the gradation value of the sub-frame SF5 increases first. As shown in FIG. 11D, the sub-frame data conversion table 2142 is set so that the gradation value of the sub-frame SF7 increases first.

In the sub-frame data conversion tables 1112, 1122, 1132, and 1142 of the Example 1, the display period of the sub-frame SF is set to be continuously increased according to the gradation value. On the other hand, in the sub-frame data conversion tables 2112, 2122, 2132, and 2142 of Example 2, the display period of the sub-frame SF is set to be intermittently increased according to the gradation value.

FIG. 12 shows the order of the sub-frames SF in which the data value becomes 1 in the projectors 11 to 14. FIG. 13 shows the relationship between the projectors 11 to 14 and the data values of the sub-frames SF at each gradation value based on FIGS. 11A to 11D.

Figure 14:
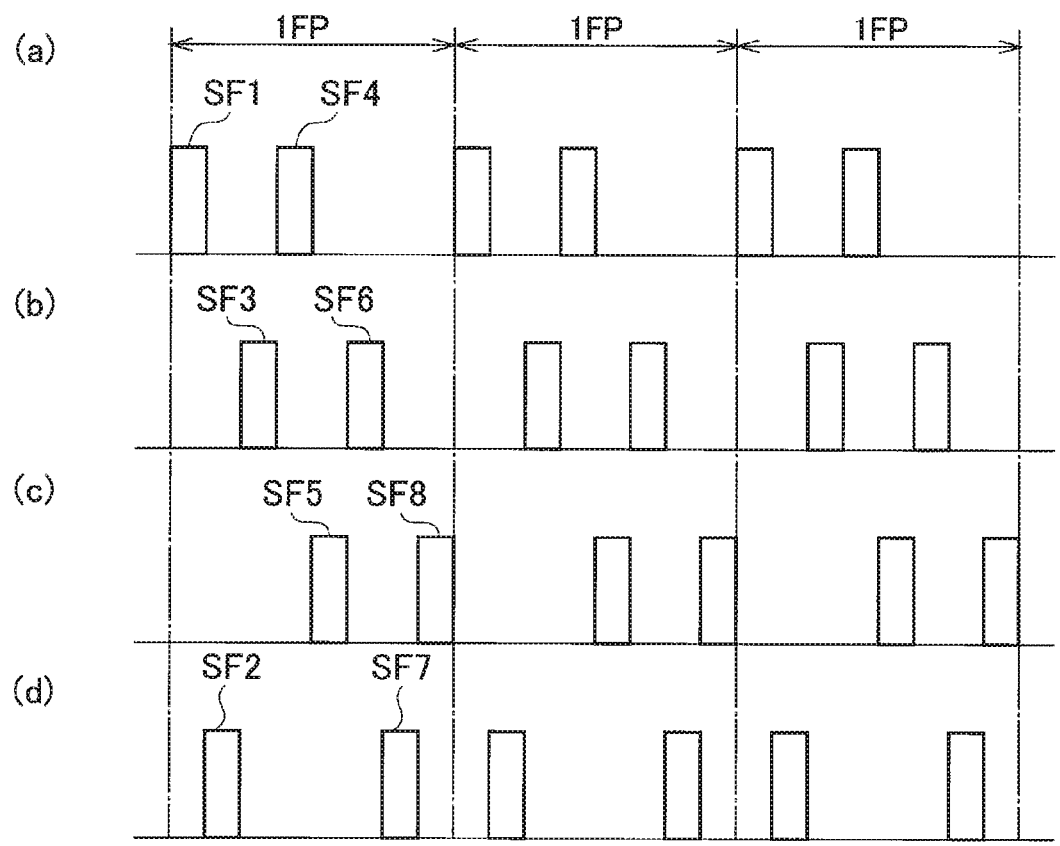
FIG. 14 is a diagram illustrating a case where a plurality of projectors convert video data into sub-frame data based on different sub-frame data conversion tables.

(a) to (d) of FIG. 14 show a case where the projectors 11 to 14 convert the video data VD into the pieces of sub-frame data SFD21, SFD22, SFD23, and SFD24 based on the sub-frame data conversion tables 2112, 2122, 2132, and 2142 shown in FIGS. 11A to 11D.

(a) to (d) of FIG. 14 show pieces of sub-frame data SFD21 to SFD24 when the gradation value is 2. The projectors 11 to 14 convert the video data VD into pieces of sub-frame data SFD21, SFD22, SFD23, and SFD24 in which the timings of the display periods of the sub-frames SF are different, based on the sub-frame data conversion tables 2112, 2122, 2132, and 2142 in which the sub-frame numbers whose gradation values increase first are different.

For example, when the gradation value is 2, the projector 11 displays an image in which the period of the sub-frames SF1 and SF4 is a display period. The projector 12 displays an image in which the period of the sub-frames SF3 and SF6 is a display period. The projector 13 displays an image in which the period of the sub-frames SF5 and SF8 is a display period. The projector 14 displays an image in which the period of the sub-frames SF2 and SF7 is a display period. That is, the sub-frames SF1 to SF8 constituting one frame are a display period in any one of the projectors 11 to 14. Therefore, the display image PV in which of all the sub-frames SF1 to SF8 are in the display period is displayed on the screen 6.

The projectors 11 to 14 according to Example 2 convert the video data VD, based on the different sub-frame data conversion tables 2112, 2122, 2132, and 2142, into pieces of sub-frame data SFD21, SFD22, SFD23 and SFD24 in which the timings of the display periods of the sub-frames SF are different.

The projectors 11 to 14 can disperse the timing of the pulsation response of the liquid crystal 43 by differentiating the timing of the display period of the sub-frame SF. This reduces the difference in the exposure amount of the images captured at the exposure time SP of a different timing so that the occurrence of a beat can be suppressed.

In the projector system 3 and the camera evaluation system 1, when the camera 4 and the projectors 11 to 14 are asynchronous, the timing of the display period of the sub-frame SF is made different for each projector 10. This reduces the influence of the timing of the exposure time SP of the camera 4 so that the occurrence of a beat can be suppressed. Therefore, in accordance with the projector system 3 and the camera evaluation system 1 according to one or more embodiments described above, the camera can be evaluated with good reproducibility.

The present invention is not limited to one or more embodiments described above, and various modification can be made within a scope not departing from a scope of the present invention.

In the projector system 3 and the camera evaluation system 1 according to one or more embodiments described above, the configuration in which the four projectors 11 to 14 are arranged in the vertical direction has been described for easy understanding. However, the configuration is not limited to that in one or more embodiments described above as long as the configuration includes a plurality of projectors 10. For example, a configuration in which a plurality of projectors 10 are arranged in a horizontal direction, or a configuration in which the projectors 10 are arranged in a vertical direction and a horizontal direction may be used. By increasing the number of projectors 10 constituting the projector system 3, the timing of the pulsation response of the liquid crystal 43 can be further dispersed. Thereby, the occurrence of a beat can be further suppressed.

What is claimed is:

1. A projector system comprising:
a plurality of projectors configured to generate an image based on input video data, and to superimpose the image to display a display image, wherein
the plurality of projectors comprises:
a video data processor configured to convert the video data into sub-frame data in which one frame is composed of a plurality of sub-frames, and
a liquid crystal display device configured to switch the images for each frame based on the sub-frame data and to display the images in a frame sequential manner, and
the video data processor comprises:
a different sub-frame data conversion table for each of the plurality of projectors, and
a sub-frame data generator configured to convert the video data into the sub-frame data based on the sub-frame data conversion table.

2. The projector system according to claim 1, wherein the sub-frame data conversion table is set so that a timing of a display period of the sub-frame is different for each of the projectors.

3. The projector system according to claim 2, wherein the sub-frame data conversion table is set so that the display period of the sub-frame is intermittently increased according to a gradation value.

4. A camera evaluation system comprising:
the projector system according to claim 1, and
a data analysis device configured to analyze detection result data generated based on a captured image obtained by capturing the display image by a camera.

* * * * *